United States Patent

Roberts et al.

[11] 3,988,113
[45] Oct. 26, 1976

[54] APPARATUS FOR TREATING ENGINE EXHAUST GASES

[76] Inventors: Arnold L. Roberts, 6942 Blenheim Court; Stuart Adelkoff, 108 Hartwood Drive, both of Pittsburgh, Pa. 15208

[22] Filed: Aug. 17, 1973

[21] Appl. No.: 389,347

[52] U.S. Cl. .............................. 23/252 R; 23/284; 23/288 F; 23/288 FC; 55/DIG. 30; 60/295; 60/297
[51] Int. Cl.² ........................ F01N 3/15; F01N 3/16
[58] Field of Search ............. 23/288 F, 252 R, 284, 23/285, 288 A; 55/DIG. 30; 527, 528; 60/299, 295, 297; 239/44, 47, 53, 54

[56] References Cited
UNITED STATES PATENTS

| | | | |
|---|---|---|---|
| 1,272,275 | 7/1918 | Klein | 239/44 X |
| 1,716,479 | 6/1929 | Bilsky | 23/288 F |
| 2,521,984 | 9/1950 | Lang | 55/528 UX |
| 2,620,893 | 12/1952 | Holt et al. | 55/DIG. 30 |
| 2,888,095 | 5/1959 | Perrini et al. | 55/528 X |
| 2,932,157 | 4/1960 | Villasenor et al. | 55/DIG. 30 |
| 2,932,364 | 4/1960 | Binter | 423/212 |
| 3,148,951 | 9/1964 | Avery et al. | 55/300 |
| 3,435,597 | 4/1969 | Levy | 55/DIG. 30 |
| 3,495,950 | 2/1970 | Barber et al. | 60/299 X |
| 3,587,210 | 6/1971 | Shriner | 23/288 F |
| 3,599,427 | 8/1971 | Jones et al. | 23/288 F |
| 3,675,398 | 7/1972 | Giarrizzo | 55/DIG. 30 |

*Primary Examiner*—Morris O. Wolk
*Assistant Examiner*—Bradley R. Garris
*Attorney, Agent, or Firm*—Carothers and Carothers

[57] ABSTRACT

An apparatus for treating engine exhaust gases for the effective removal of carbon monoxide, hydrocarbons and/or the oxides of nitrogen from the exhaust system of mobile internal combustion engines. A readily accessible exhaust treating tube in the engine exhaust pipe system contains a removable and disposable open end cartridge which, in turn, contains a fibrous filter which is impregnated with a chemical solution for treating the exhaust gases passing therethrough. The disposable cartridge may be easily replaced at regular intervals by simply removing the spent cartridge and inserting a new one.

11 Claims, 3 Drawing Figures

U.S. Patent  Oct. 26, 1976  3,988,113
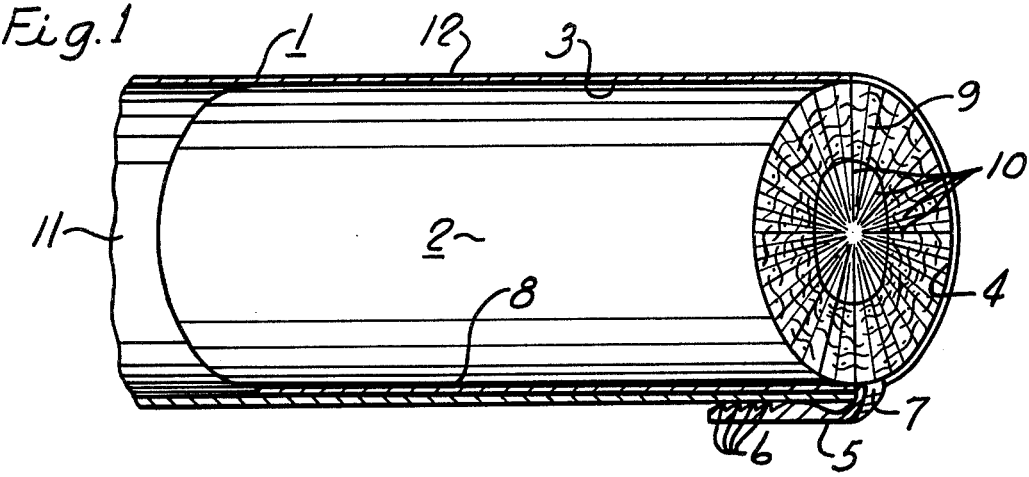
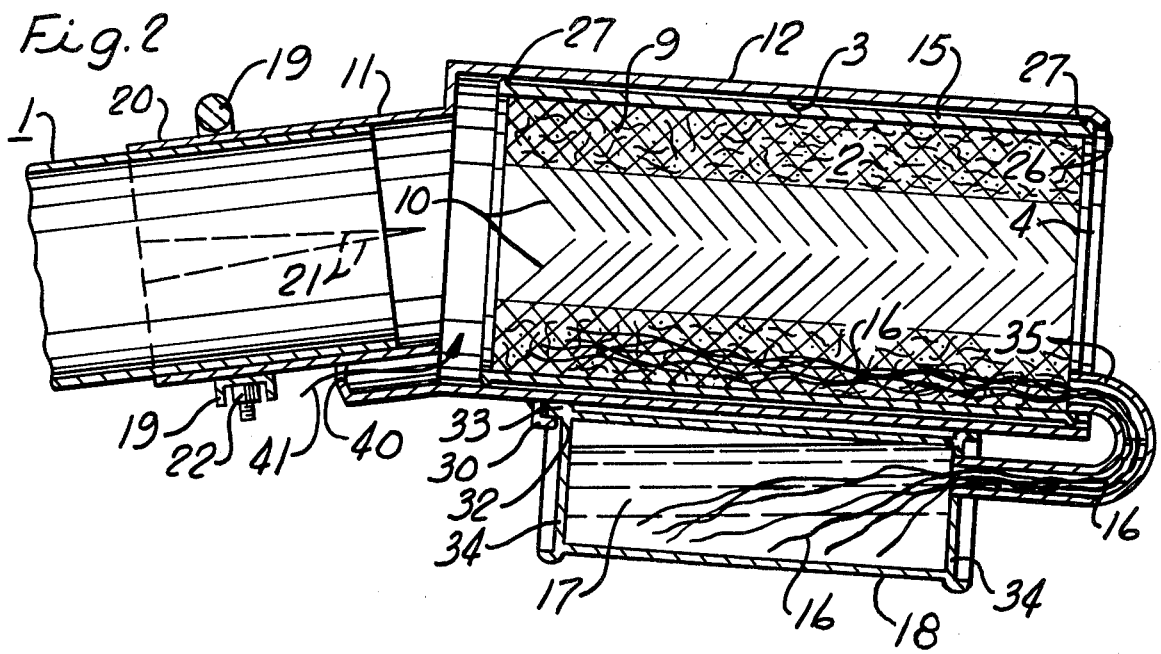
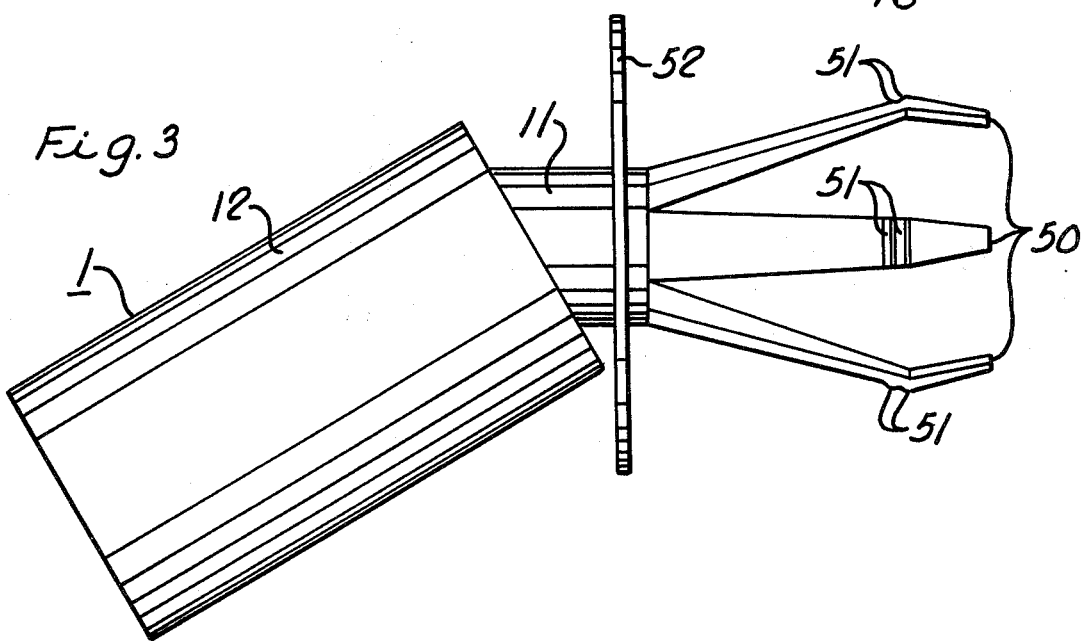

APPARATUS FOR TREATING ENGINE EXHAUST GASES

BACKGROUND OF THE INVENTION

The present invention relates to an improved apparatus for treating engine exhaust gases and more particularly to disposable filters for engine exhaust gas treating systems.

Recent laws and political and popular pressure to reduce or eliminate air pollution by automotive vehicles has resulted in the strenuous efforts towards many different means for treating the engine exhaust gases emitted from internal combustion engines. These efforts have led to a number of adequate means for reducing the harmful hydrocarbons, carbon monoxide and oxides of nitrogen content which exist in the exhaust stream. These previously known methods and apparatus either catalytically or otherwise chemically treat the polluting exhaust fumes in the vehicle engine exhaust pipe system. Examples of such systems may be found in the following U.S. Pat. Nos. 2,932,364; 2,970,886; 3,599,427; and 3,729,936.

While each of these methods and apparatus are effective in reducing the pollutants found in the conventional engine exhaust stream, they do not provide a simple, inexpensive filtering system which may be replenished or replaced at regular intervals with minimum skill. The exhaust gas treating systems heretofore proposed provide no means by which one of limited skill may readily and easily attach the filtering system to his own automobile exhaust pipe system and replenish or replace the same at regular intervals without the need of assistance from an experienced mechanic. Typically, in the prior art systems, the filtering systems are an integral part of the exhaust system, and there is no quick, each method of replacing the filtering or catalytic systems or replenishing them without the use of additional tools and mechanical ability on the part of the operator. It is the principal object of the present invention to eliminate these disadvantages.

SUMMARY OF THE INVENTION

An apparatus for treating engine exhaust gases wherein an engine exhaust treating tube having a chamber therein is serially connected in an engine exhaust pipe system including the crank case breather or exhaust system. This chamber is provided with access for the insertion and removal of a cartridge which mates the internal walls of the chamber. The cartridge is dispoable and is provided with means to temporarily retain it within the treating chamber. The cartridge is axially open at opposite ends for the passage of exhaust gases therethrough and a fibrous filter means is provided within the cartridge and impregnated with a desired chemical solution for treating the exhaust gases to remove or convert undesirable pollutants contained therein.

Such desired chemical solutions for the treatment of the exhaust fumes may be ammonia water, ammonium carbonate, urea, hexamethylene tetramine, hydrazine, ethylene diamine and any other chemical or catalytic solution such as may be mentioned in or derived from the above-mentioned prior art patent references or any additional chemical solution which is found to be effective for removing or converting pollutants in the engine exhaust stream to gases or other chemical compounds which are nontoxic or nonpoisonous, or which are less toxic or poisonous, to humans.

The fibrous filter means is constructed of a fibrous material, and is preferably comprised of an asbestos material. As examples, asbestos materials such as Chrysotile, Amphibole, Crocidolite and Amosite asbestos may be utilized. Such fibrous materials should be highly resistant to heat and chemical reactions.

The disposable cartridge is preferably annular in cross section, as is the fibrous filter contained therein. The asbestos filter is also preferably a tubular member of woven asbestos fibers which mates the inside annular walls of the cartridge and then spaced asbestos strands extending radially inward from this tubular member are provided to alloy eacy flow of the exhaust gases through the filter with thorough contact of the polluted fumes and the treated strands.

The disposable cartridge may be prepackaged in a closed annular can with the desired chemical solution contained therein. Both ends of the can may then be readily removed, as by the popular tear-top methods now used which require no additional tools for removal of the can tops, and the excess solution poured off. The cartridge is then inserted in substitution for the spent cartridge.

In its preferable form, the exhaust treating tube with its exhaust treating chamber is secured to the open trailing end of the exhaust pipe system of the automobile where ready access to the chamber may be had, by merely inserting the cartridge into the open chamber end. The cartridge is thus preferably provided with a clamp means to retain the cartridge in the treating chamber while in use. This clamp may consist of nothing more than a spring clamp which automatically engages the outer walls of the exhaust treating tube.

The exhaust treating tube may, in addition, by inclined downwardly from its junction point with the open trailing end of the exhaust pipe system in order to assist in the unnecessary escape of the chemical solution treating fumes into the atmosphere. The chemical treating fumes are thus directed back into the exhaust sytem when the engine is not operating rather than being continually expelled into the atmophere.

The exhaust gas treating tube may be adjustably secured to the open trailing edge of the exhaust pipe system or vent tube from the crank case, and it is preferably provided with a clamp means to secure the treating chabmer to the conventional exhaust tailpipe. This clamp means may further be made adjustable to accomodate different tailpipe or tube diameters and shapes.

In addition, the engine end of the treating chamber may be vented to the ambient atmosphere such that the vent enters the engine end of the exhaust treating tube in juxtaposition with the exhaust pipe from the engine which opens into the treating chamber so that the passage of the exhaust gases under pressure through the treating chamber will also draw oxygen from the atmosphere through the vent by venturi action to assist in the oxidation of the pollutant gases.

A closed canister containing the desired chemical treatment solution may be secured as an integral part or attached relative to the exhaust gas treating filter, and a wick provided such that it passes through the canister and communicates the chemical solution therein with the fibrous filter to continually replenish the same with the solution contained in the canister by the action of absorption or the combination of absorption and gravity.

As an alternative, the saturated filter may also be directly inserted into the exhaust pipe treating chamber without the containing cartridge. It should also be realized that the exhaust gas treating chamber may comprise the latter part of the open trailing end of the exhaust pipe system itself.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

FIG. 1 is a perspective view in partial section of the apparatus for treating engine exhaust gases of the present invention in its simplest form.

FIG. 2 is a sectional view in side elevation of another embodiment of the engine exhaust gas treating apparatus of the present invention.

FIG. 3 is a view in side elevation illustrating the apparatus of the present invention with a special adaptor for attaching the same to conventional automobile exhaust pipes and crank case breathers.

DETAILED DESCRIPTION OF THE PREFERRED EMBODIMENT

Referring to FIG. 1, the open trailing end 1 of an automobile exhaust pipe is illustrated with a filter cartridge 2 contained therein and radially mating the interior walls of the trailing exhaust pipe end 1. Thus, the trailing end 1 of the exhaust pipe provides an exhaust treating tube having a treating chamber 3 defined therein which is serially connected in the engine exhaust pipe systen, and in this instance, the chamber 3 is the last element or section of the exhaust pipe system.

In view of the fact that the chamber 3 is provided at the trailing end 1 of the exhaust pipe system, access is provided to the chamber for insertion of the filter cartridge 2 by merely inserting the same in the open end 4 of the exhaust tailpipe 1.

The filter cartridge 2 is retained within the chamber 3 by means of spring clamp 5 which has sharp reversed ribs 6 to grip the outside wall of the exhaust pipe end 1.

Spring clip or clamp 5 flexes about its bent portion 7 and is provided with an elongated arm 8 which extends into the chamber 3 of the exhaust pipe and is rigidly secured to the filter element 2 itself. It may be secured by glue, or the arm 8 may be woven directly into the filter element by any other suitable means. Also, a plurality of clamps may be provided if required to prevent accidental removal of the filter.

The filter 2 may also be enclosed in a can as described hereinafter in relation with the structure of FIG. 2.

The filter cartridge 2 consists of a tubular member 9 which is composed of loosely woven asbestos material and a central filtering core composed of asbestos fibers or strands 10 radially protruding therein for the length of the filter cartridge 2. Thus, the strand core 10 permits relatively free passage of the exhaust fumes from the engine end 11 of the chamber 3 to the open end 4, as the filter core 10 is open at both axial ends and the strands 10 comprising the core are spaced and not in a woven relationship as is the outer tubular member 9.

The purpose of the annular tubular member 9 of the filter cartridge 2 is to absorb and retain the desired chemical treating solution or solid chemical treating particulate in order to grandually feed the chemical treating agent retained therein to the strand core 10 over a prolonged period of time to thereby continually replenish the chemical agent to the filtering core 10 through which the hot exhaust fumes pass to react with the chemical treating agent retained by the strands 10.

While any suitable fibrous material which will not ignite when subjected to the high temperatures of the internal combustion engine exhaust gases and is highly resistant to corrosive chemicals is suitable for the filter cartridge 2, asbestos as presently existing on the market has been found to be the most suitable material. Any asbestos material may be employed such as Chrysotile, Amphibole, Crocidolite or Amosite asbestos.

The asbestos strands 10 may be formed by pulling them up from the lossely woven fiber tubular member 9, or they may be provided by inserting a multitude of continuous fiber strands 10 radially through the tubular member 9 throughout its entire length.

The tubular member 9 as shown comprises approximately 50% of the cross-sectional area of the entire filter cartridge 2 in order that the tubular member 9 is of sufficient size to retain enough chemical treating agent to provide as long a duration thereof as possible, for continually replenishing the chemical treating agent to the filtering strands 10.

Almost any desirable chemical treating agent may be employed such as ammonia water, ammonium carbonate, urea, hexamethylene tetramine, hydrazine, ethylene diamine, and any of the other compounds which readily release ammonia or functions as its chemical equivalent. Also, any of the elements or their solutions thereof as suggested in the aforementioned prior art patent references may be utilized.

For example, if the filter eleent 2 is to be used with ammonia water, the entire element would be saturated with ammonia water prior to insertion into the exhaust treating chamber 3. This impregnation of the filter cartridge 2 could be made just prior to insertion of the same into the exhaust gas treating tube 12 or the filter cartridge 2 could be prepackaged in a sealed container such as a tin can which also contains the ammonia water, or the tin can body may act as the outer wall of the filter as received in the treating tube. In the latter situation, when a new filter element 2 is required, one end of the can would be opened and the excess ammonia water poured off and then the filter element would be removed and inserted into the exhaust gas treating chamber 3 as illustrated in FIG. 1. If the tin can body is retained as the wall of the filter 2, then the other end of the can would be removed and thus inserted.

In operation, the exhaust gas filtering strands 10 forming the internal core of the filter member or cartridge 2 act much as the cilia found in the human nose for the filtering out of impurities entering the body. In addition, the fumes are chemically treated to remove the undesirable pollutants or to chemically convert them to an acceptable state.

Thus, the filter cartridge 2 may be readily removed and replenished with ease by the operator of the automobile with no special mechanical skill being required. This is particularly true in view of the fact that the exhaust treating chamber 3 is nothing more than the trailing end of the tailpipe 1 and thus ready access may be had to the chamber.

However, it should be realized that the same filter element 2 may be employed in a treating chamber which is intermediate the open end 4 of the exhaust pipe system and the automotive engine to which it is connected. In such an instance, the exhaust gas treating tube 12 would be provided with a door access for insertion and removal of the cartridge 2.

The impregnated filter cartridge 2 would be changed or recharged at regular intervals, such as each time the automobile is refilled with gasoline. At this time, the filter may be removed and reimpregnated with the desired solution, or it may simply be discarded and a new impregnated filter cartridge 2 substituted therefor.

Returning once again to the asbestos materials selected for manufacture of the filter cartridge 2, the different types of asbestos materials mentioned may be selected for additional advantages which accrue due to inherent characteristics of each different type of asbestos material mentioned. For example, Chrysotile asbestos can be readily spun into a loosely woven material to act as a filter, and in addition it has a high tensile strength and withstands temperatures up to 700° F. It also has a very good resistance to chemical reaction and finally contains magnesium, which is advantageous in addition to the chemical treating agent in treating the polluted exhaust gases.

For example, if ammonium hydroxide solution is used with the Chrysotile asbestos which contains magnesium, it will react as a catalyst with heat from the exhaust system which gives a simple chemical reaction of a strong base (ammonium hydroxide solution) with the slightly acidic carbon monoxide and oxides of nitrogen.

Amphibole asbestos which contains most of the remaining forms of asbestos, would have the same advantages as Chrysotile, Crocidolite, Tremolite (which in particular is especially resistant to chemicals) and Amosite. Crocidolite has long coarse fibers that can be readily woven and is highly resistant to acids and high temperatures. Amosite has unusually long coarse fibers and a high iron content, which can be advantageous in treating the exhaust fumes coming through the filter cartridge 2. This high iron content is desirable because it can act as a catalyst, and it is believed that a state electric charge can be induced into the Amosite asbestos thereby greatly enhancing a favorable chemical reaction. In other words, the iron content of the asbestos helps to line up the molecules passing through the filter thereby making it more adaptable for chemical reaction.

As previously stated, other filter media may be utilized as long as they permit free passage of the exhaust emissions and do not ignite or otherwise deteriorate for the intended span of use.

Referring next to the embodiment illustrated in FIG. 2, like elements are numbered with the same reference number as those found in the embodiment of FIG. 1.

In the embodiment of FIG. 2, the filter cartridge 2 is illustrated in cross section. However, in most other respects it is identical to the filter cartridge 2 illustrated in FIG. 1, with the exception that in the instance of the embodiment shown in FIG. 2, the filter cartridge 2 includes an outer cylindrical cartridge body 15 and the asbestos wick 16 which is inserted or woven into the fibrous tubular member 9 of the filter cartridge 2 and extends downwardly into a reservoir surplus of the chemical treating solution 17 which is contained in cartridge 18, which in turn is attached or suspended directly underneath the exhaust treating tube 12 in order to continually resupply the treating solution to the filter cartridge 2 by means of absorption through the wick 16.

In this particular embodiment, the exhaust treating tube 12 is not an integral part of the trailing end portion 1 of the exhaust pipe system of the internal combustion engine to which it is connected, as is the case with FIG. 1. In this instance, the exhaust treating tube 12 is a separate structure fabricated from heat-resistant plastic or metal which is secured to the trailing end 1 of the exhaust pipe by means of clamp 19 which is nothing more than a conventional muffler clamp as presently used for connecting mufflers to present day exhaust pipe systems in automobiles. This configuration thus permits adaptation of the filter system to exhaust pipes or tubes of any diameter.

The exhaust gas treating tube 12 is provided with a connecting sleeve 20 which coaxially overlies the trailing end of the exhaust pipe 1. The connecting sleeve 20 is provided with a pair of opposed longitudinal triangular-shaped slits 21 (one of which is illustrated), in order to permit the diameter of the connecting sleeve 20 to be expanded or contracted to fit exhaust tailpipe ends of different diameters. When the connecting sleeve 20 is inserted over top of the end of tailpipe 1, clamp 19 is then engaged by turning down nuts 22 in order to firmly retain connection of sleeve 20 in tight engagement with the tailpipe end.

While in this embodiment, the filter cartridge 2 is illustrated in combination with an asbestos wick 16 which communicates the filter cartridge 2 with the filter solution 17, it may nevertheless be provided without the wick 16 in a similar manner as the emodiment of FIG. 1.

In the embodiment of FIG. 2, the filter cartridge container 15 is in reality the cylindrical wall of a can such as a cylindrical tin can in which the internal fibrous portion or tubular member 9 and strand core member 10 of the filter cartridge 2 are housed and prepackaged. The fibrous portion of the cartridge 2 is prepackaged in the sealed container 15 with top and bottom ends sealing the cylindrical container 15. The container is also filled to a desired degree with the selected chemical treating solution in order to impregnate the asbestos filtering element contained therein with the solution. When a new cartridge is to be inserted into chamber 3, the opposed axial ends of container 15 are removed by a conventional can opener or by the newly popular tear-top methods which require no additional tools to remove the ends, and the excess chemical treating solution is poured off the filter and the canister including the container 15 and the chemically-impregnated fibrous filter therein are inserted as a unit in the open end 4 of the exhaust gas treating tube 12 with the canister 18, integrally connected to container 15 by means of conduit 35, depending thereunder.

The open end 4 of the exhaust gas treating tube 12 is provided with a small downwardly struck protrusion 26 which takes the place of the spring clamp 5 illustrated in FIG. 1. This downwardly struck protrusion 26 extends inwardly only an amount sufficient to retain the filter canister 2 within the chamber 3 by retaining the rim 27 of the conventional tin can type container 15 formed by the normal juncture between the removed can lid and the container wall 15 with a more or less snap fit so that the canister 2 may be withdrawn from the chamber 3 by merely snapping the end rim 27 of the container wall 15 past the downwardly struck protrusion 26. However, the effect of the downwardly struck protrusion 26 is such that the pressure of the internal exhaust gases being emitted through the filter core 10 of the exhaust treating tube 12 are not sufficient to automatically expel the cartridge 2 from the chamber 3 out the trailing opening 4.

When the reservoir 17 of reserve chemical solution is provided by canister 18, canister 18 is supported or suspended rigidly to the underside of exhaust treating tube 12 by means of the opposed snap lip 30, which depends downwardly from the bottom side of the tube 12. Snap lip 30 is secured directly to the underside of tube 12 by means of welding, or it is directly molded or integrally molded therewith.

Snap lip 30 has a rounded snap surface 32 which fits under the perimetral end lip 33 of canister 18. The rounded end 32 permits the perimetral lip 33 of canister 18 to be snapped over and past end lip 32, or the rim 33 may simply be slid over end 32 when the entire integral unit is inserted.

A U-shaped metal conduit 35 integrally joins canister 18 with cartridge body 15. In the embodiment shown, conduit 35 is rigidly secured as by welding to both canister 18 and cartridge body 15. The fibrous filter cartridge is provided with a continuous supply of the chemical treating solution from the reservoir 17 through wick 16, which is dispersed throughout the fibrous tubular member 9 of the filter cartridge 2.

As an alternative, U-shaped conduit 35 may be provided as an integral part of canister body 15, but independent of canister 18. In this situation, the conduit 35 would be provided with a sharp perforated puncturing tip for piercing the end of a canister 18. The perforated piercing tip would contain the portion of the wick 16 immersed in the solution reservoir 17.

Other methods of refurbishing the supply of the chemical treating solution though the filter cartridge 2 are contemplated other than by absorption through a wick such as wick 16. For example, a similar cartridge to that illustrated by reference numeral 18 may be provided on top of the exhaust gas treating tube 12 rather than underneath and further provided with an aperture of a predetermined diameter whereby the solution would directly drip a predetermined rate into the fibrous filter cartridge 2.

If desired, an additional feature can be added as illustrated in FIG. 2 wherein an air vent 40 is provided to the exterior of the exhaust gas treating tube 12. The vent 40 enters the engine end 11 of the exhaust gas treating tube 12 in juxtaposition with the exhaust pipe opening of tailpipe 1. Thus, as the hot gas fumes are forced from exhaust pipe 1 through filter cartridge 2 such that a venturi effect is created thereby sucking in air from the surroundings as indicated by arrow 41 to assist in oxidizing the pollutant contained in the exhaust fumes within chamber 3.

It should also be noted that connecting sleeve 11 is slanted with respect to exhaust treating tube 12 such that exhaust treating tube 12 is directed downwardly from the more or less level position of exhaust tailpipe 1. This holds filter cartridge 2 in a downward position, such that the fumes evaporating from the chemcial treating solution or agent contained within the filter will tend to flow up into the exhaust system rather than to be expelled and wasted into the ambient atmosphere.

It is also within the scope of the present invention that a color testing agent such as litmus paper or some other compatible testing agent may be employed or directly incorporated into the end of the filter cartridge 2 to indicate depletion of the chemical treating agent thereby signalling the automobile operator that it is time to replace the cartridge.

Referring next to FIG. 3, again the similar elements are designated with the same numerals as those elements illustrated in FIGS. 1 and 2.

FIG. 3 illustrates a means for quick attachment of the exhaust treating tube 12 to the conventional exhaust system tailpipe. In this embodiment, the connection sleeve 11 is provided with three integral and uniformly spaced spring arms 50 which in their natural unbiased position are extended outwardly as illustrated from their base connections to sleeve member 11.

Each of the spring members or arms 50 are in addition provided with sharp ribs 51 at the outermost radial extension of the arms 50. The unit as illustrated is connected to the conventional exhaust tailpipe by compressing the three arms 50 radially inward toward each other by hand until they are within a circumferential diameter which is less than that of the exhaust tailpipe to which it is to be inserted. The contracted arms 50, which are positioned to the right of annular plate 52 as seen in the figure, are then inserted together into the interior of the exhaust tailpipe until the open end of the exhaust tailpipe strikes and rests against the right side of the annular cover plate 52, which is rigidly connected to the connecting sleeve member 11. The annular plate 52 serves to seal off the escape of exhaust gases past the open end of the tailpipe in which the arms 50 are inserted, thereby forcing the exhaust gases to pass on through the interior of connecting sleeve 11 and exhaust gas treating tube 12.

Once the arms 50 are retained within the interior of the exhaust tailpipe, they will automatically spring outwardly against the inside of the exhaust pipe and engage the same with the sharp rib members 51 thereby preventing acidental removal of the entire unit due to the gripping action of the three arms 50.

We claim:

1. An apparatus for purifying engine exhaust gases comprising, an engine exhaust pipe system, an engine exhaust gas purifying tube having a chamber serially connected in said engine exhaust pipe system and having access means for the insertion and removal of a filter cartridge radially mating the walls of said chamber, a disposable filter cartridge in said chamber and radially mating the walls thereof, said cartridge including filter means consisting of asbestos material in the form of a woven tubular fibrous asbestos filter member with a center core of loosely spaced fibrous filter strands freely extending substantially radially inward from said tubular member for the passage of exhaust gases therethrough, said fibrous filter member and strands in said cartridge being impregnated with a desired liquid chemical for purifying said exhaust gases.

2. The apparatus for purifying engine exhaust gases of claim 1 wherein said asbestos material is a member selected from the group consisting of Chrysotile, Amphibole, Crocidolite, Amosite and mixtures thereof.

3. The apparatus for purifying engine exhaust gases of claim 1 wherein said disposable cartridge also includes a cylinder containing said filter means.

4. The apparatus for purifying engine exhaust gases of claim 1 wherein said woven tubular member covers approximately 50% of the cross sectional area of said filter means.

5. The apparatus for purifying engine exhaust gases of claim 1 further comprising air inlet means for admitting air into the interior of said exhaust gas purifying tube, said air inlet means located upstream of said filter cartridge in juxtaposition with the trailing end of said exhaust pipe system.

6. The apparatus for purifying engine exhaust gases of claim 1 further comprising a closed canister containing said liquid chemical and secured relative to said exhaust gas purifying tube, and a wick passing through said canister and communicating said liquid chemical therein with said fibrous filter member to continually replenish said member with said chemical.

7. The apparatus for purifying engine exhaust gases of claim 1 wherein said exhaust gas purifying tube is secured to the open trailing end of said exhaust pipe system.

8. The apparatus for purifying engine exhaust gases of claim 7 further comprising means on said cartridge for retaining said cartridge in said engine exhaust gas purifying chamber.

9. The apparatus for purifying engine exhaust gases of claim 8 wherein said exhaust gas purifying tube is inclined downwardly from the juncture thereof with said open trailing end of said exhaust pipe system.

10. The apparatus for purifying engine exhaust gases of claim 8 further comprising clamp means for securing said exhaust gas purifying tube to said open trailing end of said exhaust pipe system.

11. The apparatus for purifying engine exhaust gases of claim 9 wherein said clamp means is adjustable to accommodate different diameter open trailing ends of said exhaust pipe system.

* * * * *

UNITED STATES PATENT OFFICE
CERTIFICATE OF CORRECTION

PATENT NO. : 3,988,113
DATED : October 26, 1976
INVENTOR(S) : Arnold L. Roberts and Stuart Adelkoff It is certified that error appears in the above-identified patent and that said Letters Patent are hereby corrected as shown below:

Col. 2, line 15, correct "alloy eacy" to read --allow easy--

Col. 5, line 44, correct "statc" to read --static--

Col. 8, line 55, correct "inwar" to read --inwardly--

Signed and Sealed this

Fifteenth Day of March 1977

[SEAL]

Attest:

RUTH C. MASON
Attesting Officer

C. MARSHALL DANN
Commissioner of Patents and Trademarks